US012777070B2

(12) United States Patent
Young de la Sota et al.

(10) Patent No.: US 12,777,070 B2
(45) Date of Patent: Oct. 27, 2026

(54) CONTROL FLOW INTEGRITY MEASUREMENTS TO VALIDATE FLOW OF CONTROL IN COMPUTING SYSTEMS

(71) Applicant: Google LLC, Mountain View, CA (US)

(72) Inventors: Miguel Cristian Young de la Sota, Cambridge, MA (US); Miguel Angel Osorio Lozano, El Dorado Hills, CA (US)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 18/711,527

(22) PCT Filed: Mar. 25, 2022

(86) PCT No.: PCT/US2022/071360

§ 371 (c)(1),
(2) Date: May 17, 2024

(87) PCT Pub. No.: WO2023/091803

PCT Pub. Date: May 25, 2023

(65) Prior Publication Data

US 2025/0007948 A1 Jan. 2, 2025

Related U.S. Application Data

(60) Provisional application No. 63/281,533, filed on Nov. 19, 2021.

(51) Int. Cl.
*H04L 9/40* (2022.01)

(52) U.S. Cl.
CPC ................................ *H04L 63/1466* (2013.01)

(58) Field of Classification Search
CPC .................................................. H04L 63/1466
See application file for complete search history.

(56) References Cited

U.S. PATENT DOCUMENTS 5,923,883 A 7/1999 Tanaka et al.
7,284,116 B2 10/2007 Jourdan et al.
(Continued)

FOREIGN PATENT DOCUMENTS

JP 2018088147 A 6/2018
WO 2020076555 A1 4/2020

OTHER PUBLICATIONS

"International Preliminary Report on Patentability", Application No. PCT/US2022/071360, May 2, 2024, 8 pages.
(Continued)

*Primary Examiner* — Vance M Little
(74) *Attorney, Agent, or Firm* — Colby Nipper PLLC

(57) ABSTRACT

This document describes techniques and apparatuses directed at implementing control flow integrity measurements to validate control flow in computing systems. Within a scope, a local variable is initialized and configured to store a measurement value of a local control flow. During operations within the scope, at least one expression is computed, outputting a return value. A fingerprinting algorithm obtains the return value, combines the return value and the measurement value, and hashes the combination to produce a digest value. The local variable is then redefined as the digest value. Next, the return value is compared to the expected, distinguished success return value in a branch instruction. Before returning a final return value, the measurement value is compared against an expected value stored in a static variable. If the comparison fails, then the program can detect an attack on the control flow.

20 Claims, 9 Drawing Sheets

(56) References Cited

U.S. PATENT DOCUMENTS

| | | | | |
|---|---|---|---|---|
| 12,541,582 | B2 | 2/2026 | Young De La Sota et al. | |
| 2002/0144236 | A1 * | 10/2002 | Beer | G06F 11/28 717/124 |
| 2004/0181684 | A1 * | 9/2004 | Hong | G06F 21/563 713/188 |
| 2006/0259744 | A1 | 11/2006 | Matthes | |
| 2008/0178010 | A1 * | 7/2008 | Vaterlaus | H04L 67/51 380/278 |
| 2008/0184016 | A1 | 7/2008 | Erlingsson et al. | |
| 2010/0146624 | A1 * | 6/2010 | Meyer | G06F 11/28 726/22 |
| 2013/0159791 | A1 | 6/2013 | Fabrice et al. | |
| 2013/0268740 | A1 | 10/2013 | Holt | |
| 2017/0024559 | A1 | 1/2017 | Hughes et al. | |
| 2018/0082057 | A1 | 3/2018 | Lemay et al. | |
| 2021/0182379 | A1 | 6/2021 | Sanchez | |
| 2021/0232396 | A1 | 7/2021 | Arsanto et al. | |
| 2021/0264020 | A1 | 8/2021 | Lemay et al. | |
| 2022/0066657 | A1 | 3/2022 | Khayat et al. | |
| 2022/0374415 | A1 | 11/2022 | Boling et al. | |
| 2022/0414218 | A1 | 12/2022 | Torvik et al. | |
| 2024/0193309 | A1 | 6/2024 | Wagner et al. | |

OTHER PUBLICATIONS

"Foreign Office Action", JP Application No. 2024-529608, May 7, 2025, 4 pages.
"Foreign Office Action", IN Application No. 202447039928, Jul. 25, 2025, 7 pages.
"Non-Final Office Action", U.S. Appl. No. 18/167,744, May 6, 2025, 12 pages.
"Restriction Requirement", U.S. Appl. No. 18/554,124, May 14, 2025, 6 pages.
"Foreign Office Action", JP Application No. 2024529608, Oct. 7, 2025, 4 pages.
"Foreign Office Action", KR Application No. 10-2024-7017716, Nov. 24, 2025, 10 pages.
"Non-Final Office Action", U.S. Appl. No. 18/554,124, Oct. 1, 2025, 9 pages.
"Notice of Allowance", U.S. Appl. No. 18/167,744, Sep. 30, 2025, 9 pages.
"Final Office Action", U.S. Appl. No. 18/554,124, Mar. 26, 2026, 10 pages.
"Notice of Allowance", U.S. Appl. No. 18/554,124, Jul. 28, 2026, 9 pages.

* cited by examiner

CONTROL FLOW INTEGRITY MEASUREMENTS TO VALIDATE FLOW OF CONTROL IN COMPUTING SYSTEMS

RELATED APPLICATION(S)

This application is a national stage entry of International Application No. PCT/US2022/071360, filed Mar. 25, 2022, which claims the benefit of U.S. Provisional Application No. 63/281,533, filed Nov. 19, 2021, the disclosures of which are incorporated herein by reference in their entirety.

BACKGROUND

As a result of the developing computerization of society, the world is increasingly susceptible to a variety of costly cyberattacks. These cyberattacks can vary in severity, not only potentially affecting a user's informational security (e.g., digital currency transactions), but also threatening the user's physical safety (e.g., autonomous driving). To thwart such cyberattacks, numerous security measures are implemented on computing devices to prevent unauthorized access to, and manipulation of, device data and communications. Although these security measures have already proven to withstand exhaustive cyberattacks, these computing devices are continually tested against state-of-the-art techniques simulating potential cyberattacks with the goal of identifying hardware or software vulnerabilities. The field of study dedicated to finding weaknesses in and breaching such security systems is referred to as cryptanalysis.

Recent cryptanalysis assessments have identified potentially security-threatening techniques involving fault injection. A fault injection attack may involve an attacker physically injecting, as opposed to a software injection, a fault into a computing system, thereby intentionally altering the behavior of an electronic component. As a result, fault injection attacks can circumvent many system security features, alter a computing system behavior to accomplish malicious intents, and/or extract confidential information. A physical fault injection attack may involve voltage glitching, clock glitching, laser injection, electromagnetic injection, and so forth. In some instances, these cyberattacks can introduce as few as four fault injections in well-defined locations to break system security.

SUMMARY

This document describes techniques and apparatuses directed at implementing control flow integrity measurements to validate control flow in computing systems. In aspects, a method is disclosed that includes maintaining a measurement value for a control flow during a scope. The method further includes generating, during the scope, an expression return value for a computation of an expression, the expression return value indicative of a successful computation of the expression or an unsuccessful computation of the expression. The method also includes altering, during the scope and responsive to generating the expression return value, the measurement value according to a computed value, the computed value based on the measurement value and the expression return value. The method additionally includes comparing the measurement value to a predetermined value to validate the control flow during the scope.

In aspects, a system is also disclosed that includes an integrated circuit having at least one processor and at least one computer-readable storage medium coupled to the at least one processor. The computer-readable storage medium includes instructions that, when executed by the at least one processor, cause the processor to perform the method described above.

This Summary is provided to introduce simplified concepts for implementing control flow integrity measurements to validate control flow in computing systems, which is further described below in the Detailed Description and is illustrated in the Drawings. This Summary is not intended to identify essential features of the claimed subject matter, nor is it intended for use in determining the scope of the claimed subject matter.

BRIEF DESCRIPTION OF DRAWINGS

The details of one or more aspects for control flow integrity measurements to validate flow of control in computing systems are described in this document with reference to the following Drawings, in which the use of same numbers in different instances may indicate similar features or components.

DETAILED DESCRIPTION

Overview

Figure 1:
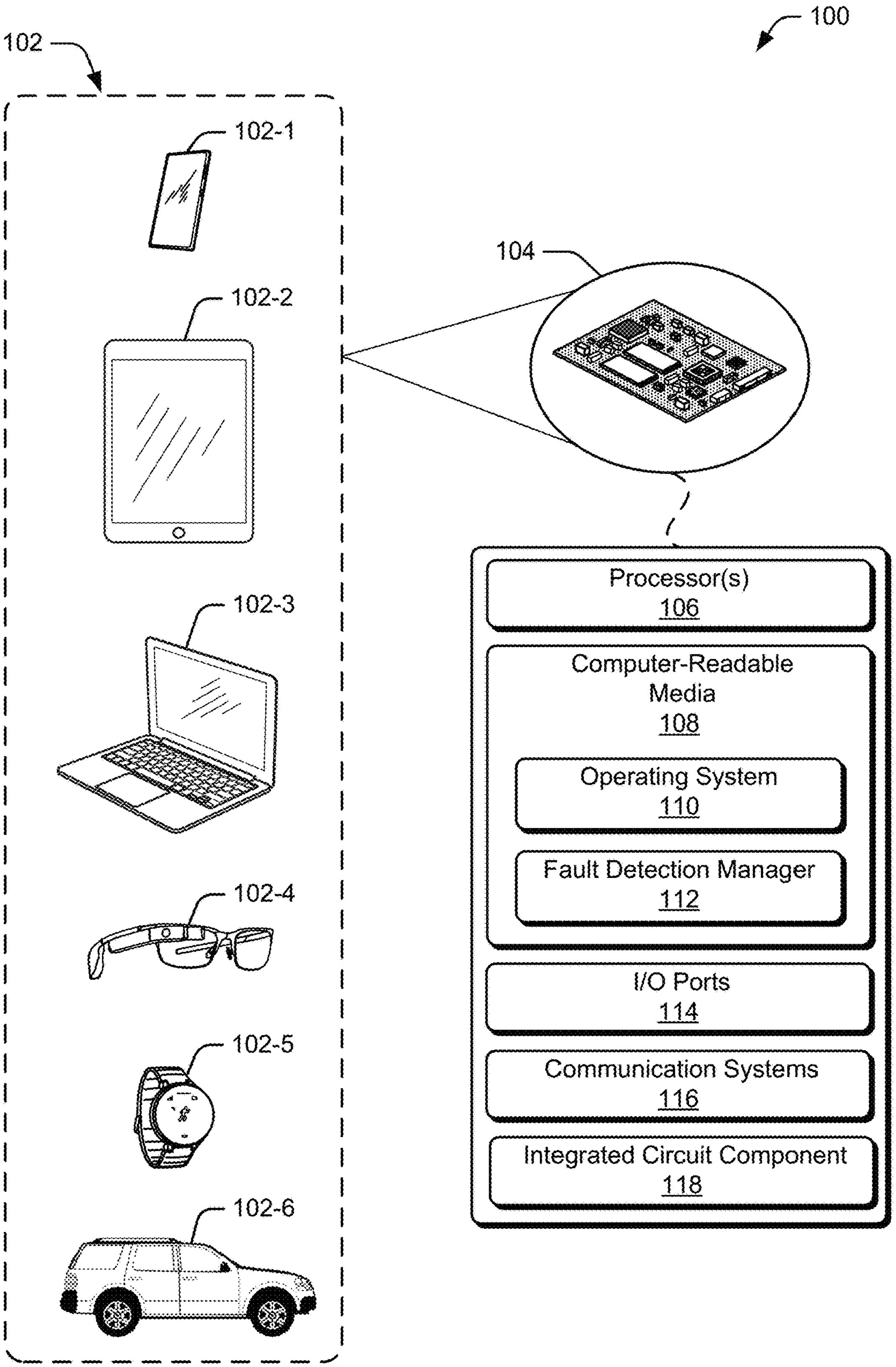
FIG. 1 illustrates an example operating environment that includes an example computing device, which is capable of implementing control flow integrity measurements.

Computing systems often include an integrated circuit with security circuitry and software to provide a measure of protection against defects, attacks, and other potentially compromising events. The security circuitry and software may implement a number of security paradigms. For example, during firmware updates, the security circuitry and software, adhering to public-key cryptography standards (PKCS) standards, may verify the authenticity and integrity of the data the computing device receives and executes using digital signatures (e.g., cryptographic signatures). A digital signature scheme is a mathematical scheme employed to validate a digital message or document. A valid digital signature gives a recipient confidence to know that the message was generated by a known sender ("authenticity") and that it was not manipulated sometime during transmission ("integrity"). In so doing, the security circuitry and software reduce the opportunity for information to be inadvertently exposed or for some function to be used in a harmful or otherwise unauthorized manner.

In today's computing environment, bad actors can attack computing devices at a myriad of levels using a multitude of attack vectors. Fault injection attacks, as an example, reduce the protection that many of these security paradigms afford. For instance, fault injection attacks can bypass many system security features, alter a system behavior to accomplish malicious intents, and/or uncover confidential information. Using a fault injection attack, an attacker can indirectly or directly alter programmed operations of an electronic component (e.g., a central processing unit) using glitches (e.g., sudden, temporary, injected faults in a system). Such an attack can sometimes "brick" a computing device, but in other instances, precise and targeted attacks can introduce compromising security threats. For instance, a targeted fault injection attack could cause a central processing unit to jump over digital signature authentication. As a result, a computing device may receive and execute unverified data or code.

Bad actors using fault injection attacks frequently target branch instructions, since branch instructions can be used to skip security level checks. Branch instructions employed within a monadic error handling programming structure are particularly vulnerable. For example, a processor executing a function having a branch instruction may return control outside of the function when an enclosed function returns an error. Since that branch instruction is the only control dependency between a return value indicating successful execution and an error check (e.g., no data dependency exists between the two), this allows an attacker to make a function signal success by skipping an early return.

To safeguard computing systems from such compromising events, this document describes techniques and apparatuses directed at control flow integrity measurements to validate control flow in computing systems. The following discussion describes an operating environment, techniques that may be employed in the operating environment, an example method, and a System-on-Chip (SoC) in which components of the operating environment may be embodied.

Operating Environment

The following discussion describes an operating environment, techniques that may be employed in the operating environment, and various devices or systems in which components of the operating environment can be embodied. In the context of the present disclosure, reference is made to the operating environment by way of example only.

FIG. 1 illustrates an example operating environment 100 that includes an example computing device 102, which is capable of implementing control flow integrity measurements. Examples of the computing device 102 include a smart-phone 102-1, a tablet computer 102-2, a laptop computer 102-3, smart glasses 102-4, a computerized watch 102-5, and an automobile 102-6. Although not shown, the computing device 102 may also be implemented as any of a mobile station (e.g., fixed-or mobile-STA), a mobile communication device, a client device, a home automation and control system, an entertainment system, a gaming console, a personal media device, a health monitoring device, a drone, a camera, an Internet home appliance capable of wireless Internet access and browsing, an IoT device, security systems, a server or data center device, and the like. Note that the computing device 102 can be wearable, non-wearable but mobile, or relatively immobile (e.g., desktops, appliances). Note also that the computing device 102 can be used with, or embedded within, many computing devices 102 or peripherals, such as in automobiles or as an attachment to a laptop computer. The computing device 102 may implement one or more macros configured to maintain a control flow integrity measurement to validate control flow in computing systems. The computing device 102 may provide other functions or include components or interfaces omitted from FIG. 1 for the sake of clarity or visual brevity.

The computing device 102 includes a printed circuit board assembly 104 (PCBA 104) on which components and interconnects of the computing device are embodied. Alternately or additionally, components of the computing device 102 can be embodied on other substrates, such as flexible circuit material or other insulative material. Although not shown, the computing device 102 may also include a housing, various human-input devices, a display, a battery pack, antennas, and the like. Generally, electrical components and electromechanical components of the computing device 102 are assembled onto a printed circuit board (PCB) to form the PCBA 104. Various components of the PCBA 104 (e.g., processors and memories) are then programmed and tested to verify the correct function of the PCBA 104. The PCBA 104 is connected to or assembled with other parts of the computing device 102 into a housing.

As illustrated, the PCBA 104 includes one or more processors 106 and computer-readable media 108. The processor(s) 106 may be any suitable single-core or multi-core processor (e.g., an application processor (AP), a digital-signal processor (DSP), a central processing unit (CPU), graphics processing unit (GPU)). The processor(s) 106 may be configured to execute instructions or commands stored within the computer-readable media 108 to implement an operating system 110 and fault-detection manager 112, which are stored within computer-readable storage media. The computer-readable storage media may include one or more non-transitory storage devices such as a random-access memory (RAM, dynamic RAM (DRAM), non-volatile RAM (NVRAM), or static RAM (SRAM)), read-only memory (ROM), or flash memory), hard drive, SSD, or any type of media suitable for storing electronic instructions, each coupled with a computer system bus. The term "coupled" may refer to two or more elements that are in direct contact (physically, electrically, magnetically, optically, etc.) or to two or more elements that are not in direct contact with each other, but still cooperate, communicate, and/or interact with each other.

The PCBA 104 may also include I/O ports 114 and one or more communication systems 116. The I/O ports 114 allow the computing device 102 to interact with other devices or users. The I/O ports 114 may include any combination of internal or external ports, such as USB ports, audio ports, Serial ATA (SATA) ports, PCI-express based ports or card-slots, secure digital input/output (SDIO) slots, and/or other legacy ports. Various peripherals may be operatively coupled with the I/O ports 114, such as human-input devices (HIDs), external computer-readable storage media, or other peripherals.

The communication systems 116 enable communication of device data, such as received data, transmitted data, or other information as described herein, and may provide connectivity to one or more networks and other devices connected therewith. Example communication systems include NFC transceivers, WPAN radios compliant with various IEEE 802.15 (Bluetooth®) standards, WLAN radios compliant with any of the various IEEE 802.11 (WiFi®) standards, WWAN (3GPP-compliant) radios for cellular telephony, wireless metropolitan area network (WMAN) radios compliant with various IEEE 802.16 (WiMAX®) standards, infrared (IR) transceivers compliant with an Infrared Data Association (IrDA) protocol, and wired local area network (LAN) Ethernet transceivers. Device data communicated over communication systems 116 may be packetized or framed depending on a communication protocol or standard by which the computing device 102 is communicating. The communication systems 116 may include wired interfaces, such as Ethernet or fiber-optic interfaces for communication over a local network, intranet, or the Internet. Alternatively, or additionally, the communication systems 116 may include wireless interfaces that facilitate communication over wireless networks, such as wireless LANs, cellular networks, or WPANs.

Although not shown, the computing device 102 can also include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

Further, an integrated circuit component 118 may be operably coupled to the PCBA 104. In implementations, the integrated circuit component 118 can be implemented as a general-purpose processor, a system-on-a-chip (SoC), or a security-oriented integrated circuit (e.g., a silicon root of trust (RoT) chip) having hardened firmware. In implementations, the integrated circuit component 118 may include, or be coupled to computer-readable storage media with, at least portions of the computer-readable media 108. For example, the integrated circuit component 118 may include the fault-detection manager 112.

The computing device 102 may also include a power system that can be implemented as one or more power supplies and a power distribution network that is configured to provide power to the integrated circuit component 118 and circuitry of the computing device 102.

Figure 2:
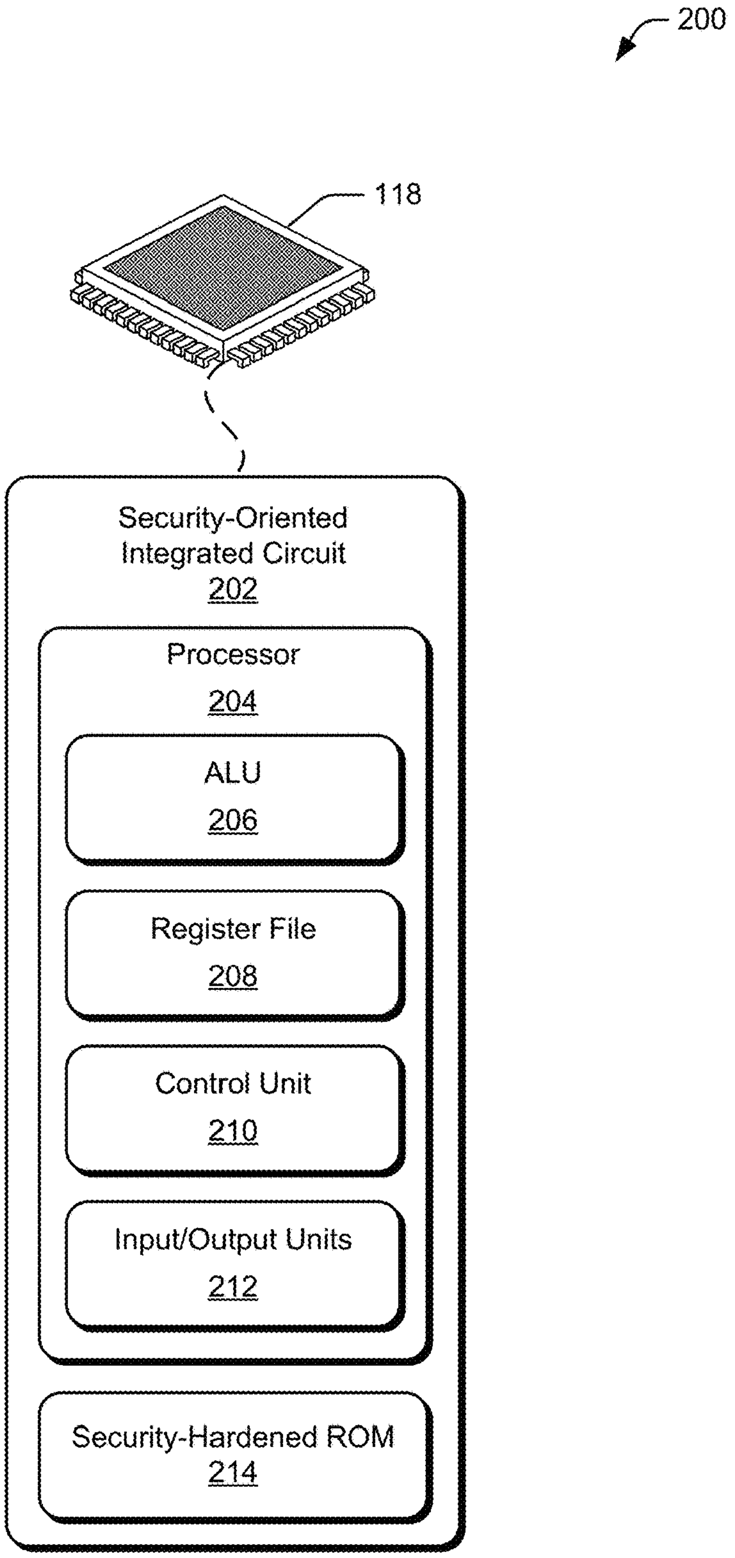
FIG. 2 illustrates an integrated circuit component implemented as a security-oriented integrated circuit.

Consider now FIG. 2 which illustrates an integrated circuit component (e.g., integrated circuit component 118) implemented as a security-oriented integrated circuit 202. This is but one example, as the integrated circuit component may be implemented as a microprocessor, a microcontroller, an SoC, and so forth. In implementations, the security-oriented integrated circuit 202 may include cryptographic software (e.g., hash-based encryption functions) and hardware modules (e.g., a hardened memory protection unit). The techniques as described herein, including maintaining a measurement value for a control flow, may be integrated within any of a variety of computing systems, including one or more security-oriented components such as the security-oriented integrated circuit 202.

As illustrated in FIG. 2, the security-oriented integrated circuit 202 includes a processor 204 having an arithmetical and logical unit 206 (ALU 206), a register file 208, a control unit 210, and input/output (I/O) units 212. The ALU 206 may be configured to perform arithmetic and logical operations on received data. The register file 208 may be an array of processor registers (e.g., control registers), serving as high-speed, semi-transient memory configured for quick data access during program or function processing. The register file 208 may be tightly coupled to the ALU 206. To further facilitate access to the data, the register file 208 may include multiple read ports or multiple write ports to enable the ALU 206 and/or execution unit to contemporaneously retrieve multiple operands in a single cycle. The register file 208 may be formed from flip-flops to accelerate reading and writing bits of the data. The control unit 210 may be configured to control the flow of data throughout the system(s). The I/O units 212 may include ports operably interfaced with other components of the device or security-oriented integrated circuit 202.

Further illustrated in FIG. 2, the security-oriented integrated circuit 202 may include security-hardened ROM 214. The security-hardened ROM 214 may include at least portions of the computer-readable media 108, including the fault-detection manager 112. In an example, the fault-detection manager 112 can be implemented as executable code. The executable code may be produced by a compiler which converts macros (e.g., source code directives for inserting specific computing instructions) of a source code (e.g., a high-level language script) into the executable code (e.g., low-level machine language). The fault-detection manager 112, implemented in the source code as a set of macros (e.g., included as one or more header files), may include function-like macros, chain macros, and/or object-like macros. The source code may further include other programs, functions, scripts, and so on.

In implementations, the security-hardened ROM 214 may be operably coupled to the processor 204. In such a configuration, the processor 204 can execute the executable code (e.g., read-only instructions) stored in the security-hardened ROM 214. As a result, the processor 204 may execute instructions of the fault-detection manager 112.

In aspects, the source code of the fault-detection manager 112 may include variables, arrays, objects, subroutines, loops, functions, and so on. A function, for instance, is a set of instructions that performs a task and outputs a return. A return ("return value"), as described herein, refers to any data type value, such as a string, Boolean, integer, and so forth, that a function, subroutine, program, etc. outputs during or after a task (e.g., computations, string manipulations). In an example, the return value may be an error code, including numeric (e.g., hexadecimal) or alphanumeric code. As further described herein, a scope refers to a block of code, including a function, subroutine, program, and so forth, that ends in a return.

In some examples, during execution of a scope, the fault-detection manager 112 may instruct the processor 204 to cease further executions (e.g., within the scope, outside the scope) due to an error that arose during execution of the scope. Further, the fault-detection manager 112 may instruct the processor 204 to output a return value containing an error code indicating a failure to complete a task ("failure error code"). In other examples, during execution of a scope, the fault-detection manager 112 may instruct the processor 204 to output a return value containing an error code indicating a successful completion of a task ("success error code") if no errors arise during execution of the scope.

In an example, the security-oriented integrated circuit 202 having the security-hardened ROM 214 may include executable instructions of a check signature function. The check signature function may cause the processor to perform tasks, including executing a obtain digital signature subfunction and executing a confirm digital signature subfunction. The check signature function may be designed to output a return value ("final return value") with an error code indicating success and, therefore, a validated digital signature.

While the processor 204 is executing the check signature function, an error may arise during the confirm digital signature subfunction. For instance, the error may manifest during a comparison of a message digest obtained from a digital signature and a digest of the corresponding message being validated against the digital signature. As a result, the confirm digital signature subfunction may return a value with the failure error code. As an example, the check signature function may be designed in a monadic error handling structure. In such an implementation, the return value having the failure error code is compared to an expected return value having the success error code in a branch instruction. If the comparison fails, then the check signature function returns early. Otherwise, if the comparison succeeds, then the program continues operations. In this way, further operations and executions of the check signature function may be ceased and the check signature function exited early ("early return"). The output of the check signature function is the return value with the failure error code of the confirm digital signature subfunction.

An attacker, using a fault injection attack, may target the branch instruction, attempting to alter the intended control flow of the computing system (e.g., the order in which individual statements, instructions, or function calls of an imperative program are executed or evaluated). In some situations, the fault injection attack targeting the branch instruction may cause the confirm digital signature subfunction to signal success by skipping the early return, thereby causing the check signature function to continue operations and executions.

To prevent a scope (e.g., check signature function) from outputting a final return value with a success error code when a fault injection attack has occurred ("tampering"), the security-hardened ROM 214 may execute instructions of the fault-detection manager 112.

Example Techniques

Figure 3:
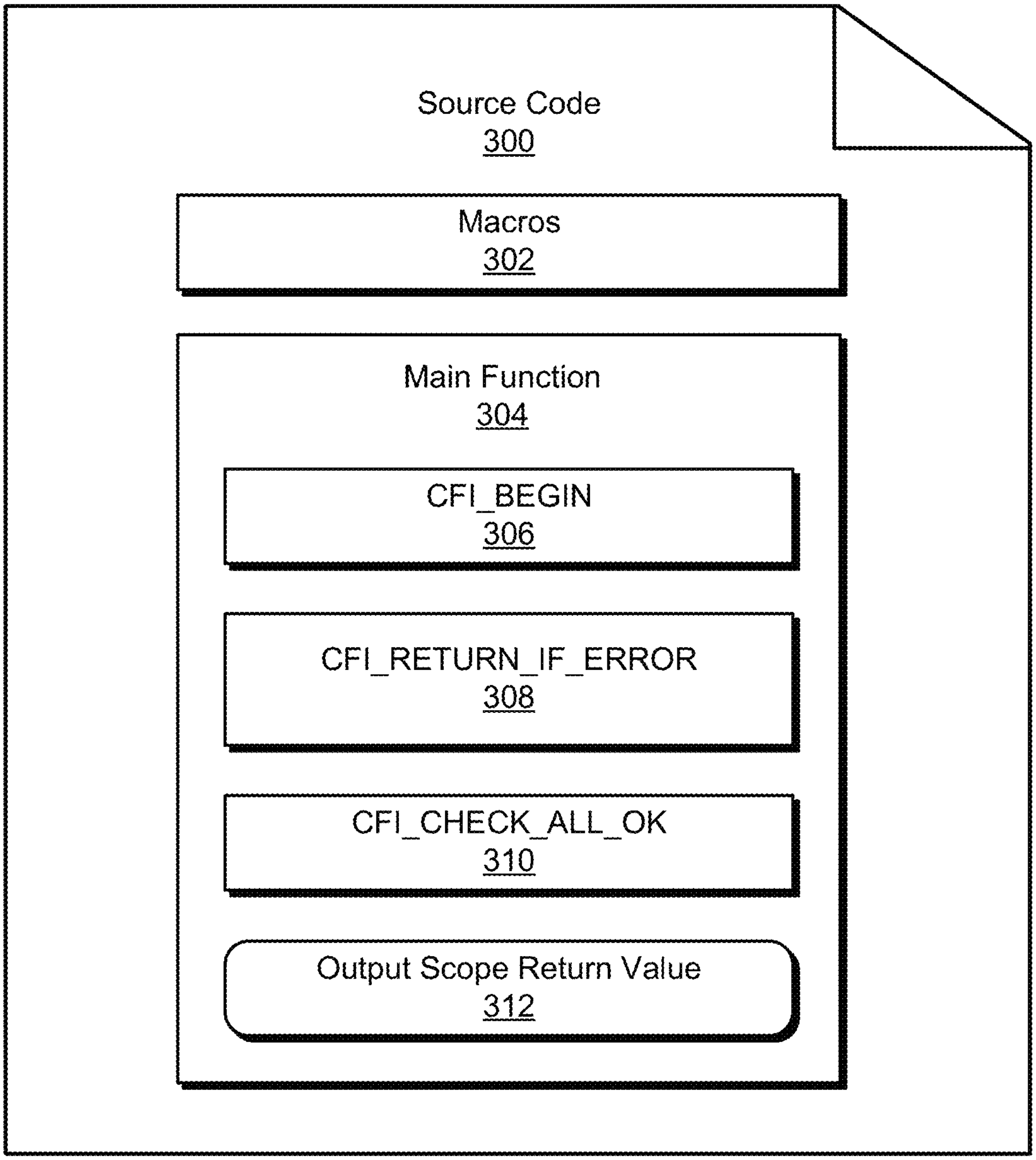
FIG. 3 illustrates an example implementation of a source code configured to implement control flow integrity measurements to validate flow of control in computing systems.

FIG. 3 illustrates an example implementation of a source code 300 configured to implement control flow integrity measurements to validate flow of control in computing systems. In an aspect, the source code 300 includes fault-detection manager (e.g., fault-detection manager 112) implemented as a set of macros 302. In one example, illustrated in FIG. 3, the source code 300 includes macros 302 defined outside of a function (e.g., a main function 304). In other examples, techniques of the fault-detection manager can be applied (e.g., called, defined) within a function (e.g., the main function 304).

As illustrated, the macros 302 may be included in the source code 300 as one or more header files. The source code 300 may include (e.g., within the macros 302) one or more expected values (e.g., hard-coded values). The expected values may be precomputed using any of a variety of mathematical operations, including fingerprinting functions and/or bitwise operations. In some examples, the mathematical operations are not cryptographic. For instance, the mathematical operations may include a non-cryptographic fingerprinting function. In at least some examples, the mathematical operations may produce a cryptographic message digest. For instance, the mathematical operations may include a cryptographic fingerprinting function.

The source code 300 may further include a main function 304 (e.g., a check signature function). In aspects, a processor (e.g., processor 204) can execute executable code (e.g., the compiled source code 300) to implement operations of the main function 304. The main function 304 may include calls to other functions. For example, the main function 304 may implement fault-detection by applying defined macros 302 to return values of called subfunctions. In so doing, as a result of the processor executing the main function 304 and applying the macros 302 to return values of called subfunctions, the processor may implement the fault-detection manager. In this way, the fault-detection manager can measure a control flow during the execution of the main function 304. For example, the main function 304 may include a call to a function CFI_BEGIN 306 defined in the macros 302.

Figure 4:
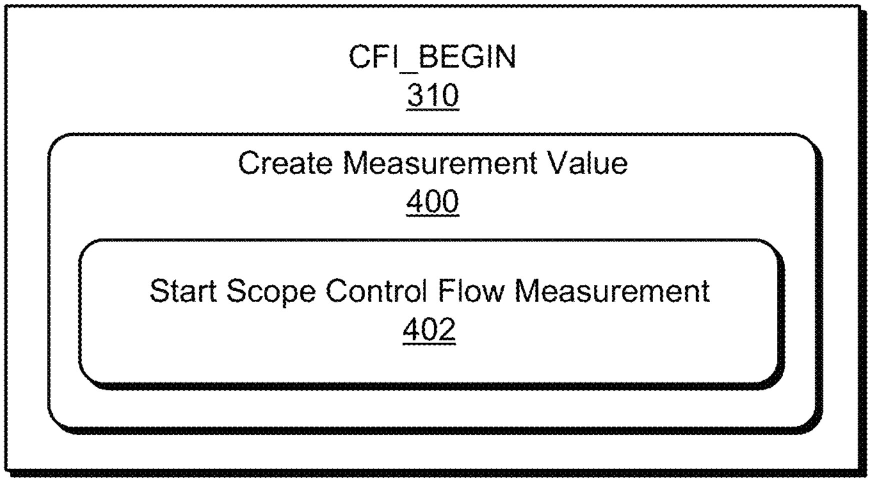
FIG. 4 illustrates a fault-detection manager configured to create a measurement value to measure a control flow during a scope.

Turning to FIG. 4, the fault-detection manager creates a measurement value to measure a control flow during a scope. In one example, creating the measurement value 400 may cause the processor to allocate space in memory (e.g., RAM) to store a name of a variable, a data type of the variable, and/or a value of the variable. Creating the measurement value 400 may be realized in the source code 300 through, for example, variable initialization, variable assignment, and/or variable declaration. The measurement value may include numeric, alphanumeric, or alphabetical values. In addition, the measurement value may be realized as a local variable or a global variable. In an implementation, the measurement value, within the source code 300, may be declared as having a datatype of long, assigned an initial value (e.g., a secret value), and stored in memory (e.g., the register file 208). Declaring the measurement value is effective, at 402, to start a scope control flow measurement. For example, the measurement value may be created to maintain a measurement of control flow for a scope.

Figure 5:
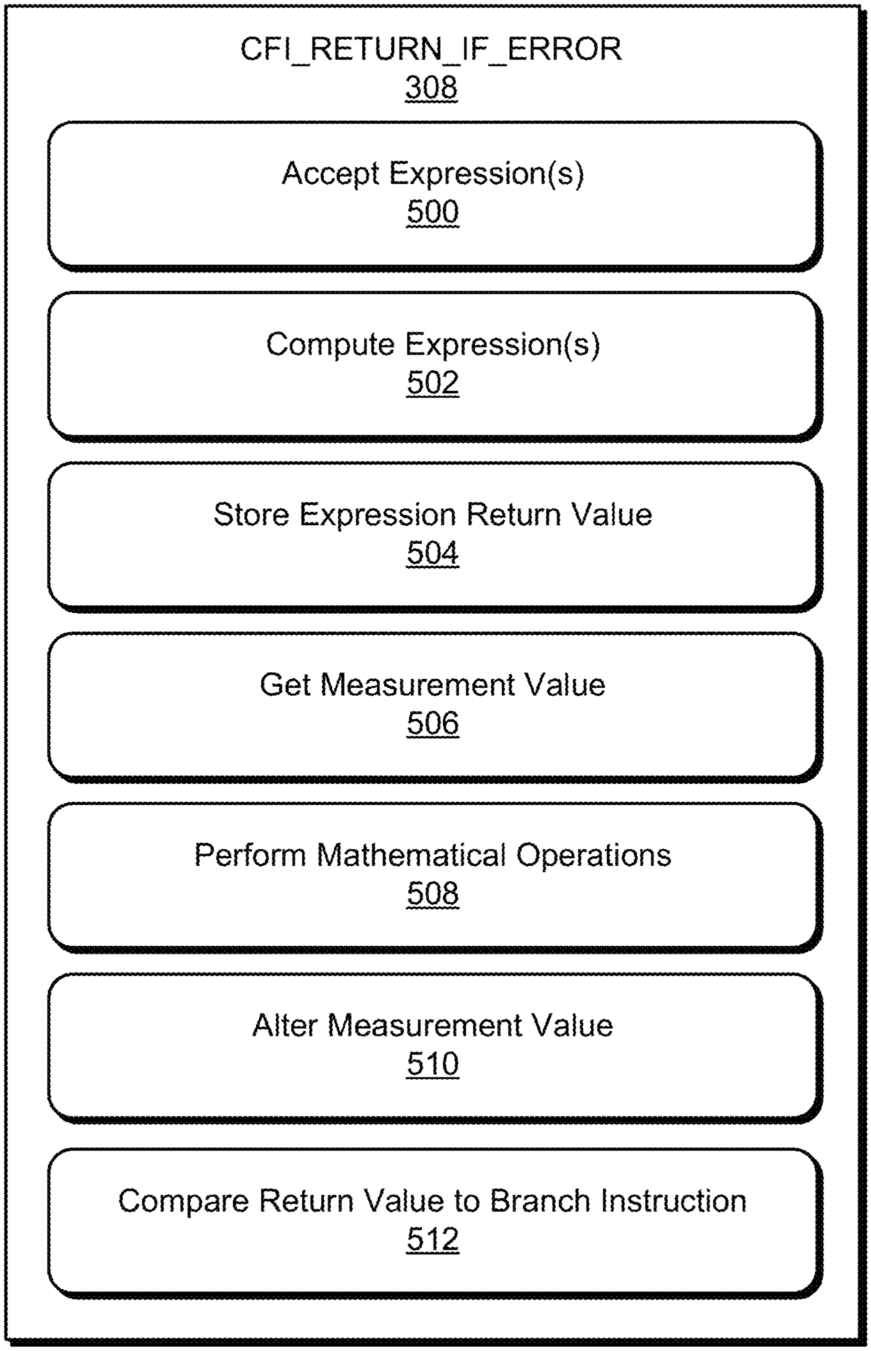
FIG. 5 illustrates the fault-detection manager configured to generate an expression return value and alter the measurement value.

Turning back to FIG. 3, momentarily, within the main function 304 and after the call to CFI_BEGIN 306, the source code 300 includes a call to a function CFI_RETURN_IF_ERROR 308 defined in the macros 302. Turning to FIG. 5, the fault-detection manager generates an expression return value and alters the measurement value.

The function CFI_RETURN_IF_ERROR 308, at 500, accepts one or more expressions (e.g., function calls). For example, the function CFI_RETURN_IF_ERROR 308 can accept a function call to obtain a digital signature. The function CFI_RETURN_IF_ERROR 308 can further, at 502, compute the expression. For example, computing the argument may involve the ALU 206 accessing the register file 208 or another memory storage device in the computing device 102 operably coupled to the PCBA 104. Resultant of the computation of the expression, an expression return value is generated. The expression return value may include a failure error code or a success error code.

The function CFI_RETURN_IF_ERROR 308 directs the processor to, at 504, store the expression return value in memory (e.g., register file 208). The function CFI_RETURN_IF_ERROR 308, at 506, gets the measurement value. For example, getting the measurement value may involve the ALU 206 accessing the register file 208. The function CFI_RETURN_IF_ERROR 308, at 508, performs one or more mathematical operations on the return value and the measurement value to generate a computed value. In aspects, performing the mathematical operations may include utilizing any of a non-cryptographic, composite fingerprinting algorithm; a non-cryptographic fingerprinting algorithm (e.g., a Fowler-Noll-Vo hash function); or a cryptographic fingerprinting algorithm, referred to herein as simply fingerprinting algorithm.

In an example implementation, the non-cryptographic, composite fingerprinting algorithm combines the expression return value and the measurement value and then hashes the combined input. The expression return value and the measurement value are then combined using a noncommunicative function, including concatenation. In other implementations, the expression return value and the measurement value are combined using an injective function, including serialization. In another implementation, the non-cryptographic, composite fingerprinting algorithm maps the combined inputs to a fixed-size digest value (e.g., hash, digest output, fingerprint), generating the computed value.

In other implementations, or in addition thereto, performing the mathematical operations may involve multiplication, shifts, additions, and/or bit operations on the expression return value and the measurement value. In a still further implementation, after one or more of the aforementioned mathematical operations, the Hamming weight of the resulting value produced by the mathematical operations may be determined. Through such techniques, performing the mathematical operations can amplify small changes into large changes (e.g., an avalanche effect).

The function CFI_RETURN_IF_ERROR 308, at 510, alters the measurement value. For example, the fault-detection manager, responsive to generating the expression return value and based on the computed value, alters the measurement value. In one example, the function CFI_RETURN_IF_ERROR 308 redefines the variable maintaining the measurement value (e.g., a previous measurement value) to the computed value. In so doing, the fault-detection manager can maintain (e.g., update, alter) the measurement value during execution of the scope.

The function CFI_RETURN_IF_ERROR 308, at 512, compares the expression return value in a branch instruction. For example, the branch instruction having an expected success error code may be compared to the expression return value using any of a variety of conditional statements. If the comparison fails (e.g., the expression return value does not indicate the expected success error code), then the function CFI_RETURN_IF_ERROR 308 may return early ("early return"), jumping over further instructions in the main function. If the comparison succeeds (e.g., the expression return value does indicate the expected success error code), then the processor may continue executing further instructions in the main function.

Figure 6:
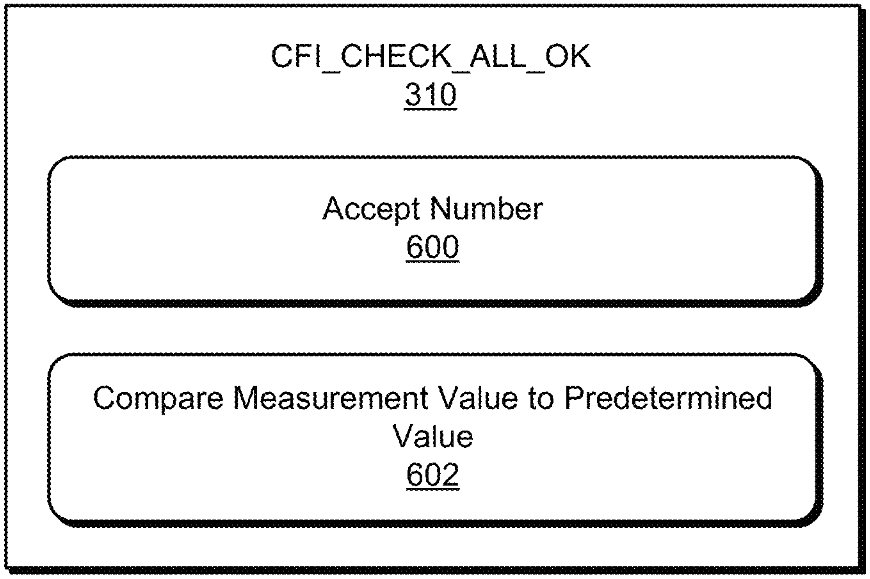
FIG. 6 illustrates the fault-detection manager configured to compare the measurement value to a predetermined value to validate the control flow during the execution of instructions within the scope.

Turning back to FIG. 3, momentarily, within the main function and after the call to CFI_RETURN_IF_ERROR 308, the source code 300 includes a call to a function CFI_CHECK_ALL_OK 310. Turning to FIG. 6, the fault-detection manager compares the measurement value to a predetermined value to validate the control flow during the execution of instructions within the scope.

The function CFI_CHECK_ALL_OK 310, at 600, accepts, as a formal argument, a number. The number may be statically known (e.g., capable of being known at compile time, hard coded in the main function 304). In some examples, the CFI_CHECK_ALL_OK 310 can accept any data type or variable relating to the number. In additional examples, the number may be predetermined (e.g., to the fault-detection manager) and may correspond to a predetermined number of calls to the function CFI_RETURN_IF_ERROR 308 within the main function (e.g., scope). In at least some examples, the number of calls to the function CFI_RETURN_IF_ERROR 308 may be predetermined based on executing one or more conditional statements (e.g., if-else statements) or iterative statements (e.g., a for loop, a do while loop) prior to CFI_CHECK_ALL_OK 310 accepting a number.

At 602, the function CFI_CHECK_ALL_OK 310 compares the measurement value to the predetermined value. For example, responsive to accepting the number 600, the function CFI_CHECK_ALL_OK 310 obtains (e.g., calculates, accesses memory) a predetermined value that is based on the accepted number corresponding to a predetermined number of calls to the function CFI_RETURN_IF_ERROR 308. The function CFI_CHECK_ALL_OK 310, at 602, compares the measurement value to the predetermined value using one or more conditional statements. In so doing, the fault-detection manager verifies that no early returns from one or more branch instructions during one or more executions of the function CFI_RETURN_IF_ERROR 308 were skipped.

In an example, if the function CFI_RETURN_IF_ERROR 308 is predetermined to be called and executed within the main function thrice, then the accepted number can be predetermined to correspond to the value three. If the predetermined value obtained by the function CFI_CHECK_ALL_OK 310 based on the value three does not correspond to (e.g., equal, indicate) the measurement value, then such an instance may indicate that one or more early returns were skipped during the execution of instructions in the main function (e.g., scope). If the comparison of the predetermined value and the measurement value fails, the fault-detection manager can respond to the tampering, such as generating an interrupt, passing control to an alert handler, preventing access to certain data, or shutting down at least part of an integrated circuit.

Turning back to FIG. 3, if the comparison of the predetermined value and the measurement value succeeds, then the main function may output a scope return value 312. In additional examples, if the comparison of the predetermined value and the measurement value fails, the fault detection manager may be configured to return a scope return value indicative of failure due to tampering, as opposed to immediately shutting down. The fault-detection manager may then be able to use the scope return value indicative of failure due to tampering to respond to the attack. Further, such an implementation may be branchless, making it difficult for an attacker to overcome. For example, the fault-detection manager may respond to the tampering by implementing a protection function, rather than shutting down the security-hardened integrated circuit.

Through the techniques described herein, the measurement value of the control flow creates explicit data dependencies between early return decisions (e.g., early return 714) and the scope return value by incorporating (e.g., hashing, combining) all expression return values in the measurement value. In addition, the fault-detection manager can be implemented into computing systems without compiler optimization. In at least some examples, a computing system using the techniques described herein can implement code (e.g., the source code) with optimizations, and yet those optimizations may not interfere with, for example, the specific ordering of the calculations performed to compute the measurement value. Further, a computing system using the techniques described herein can implement the fault detection manager without modifications to a compiler.

Example Implementation

Figure 7:
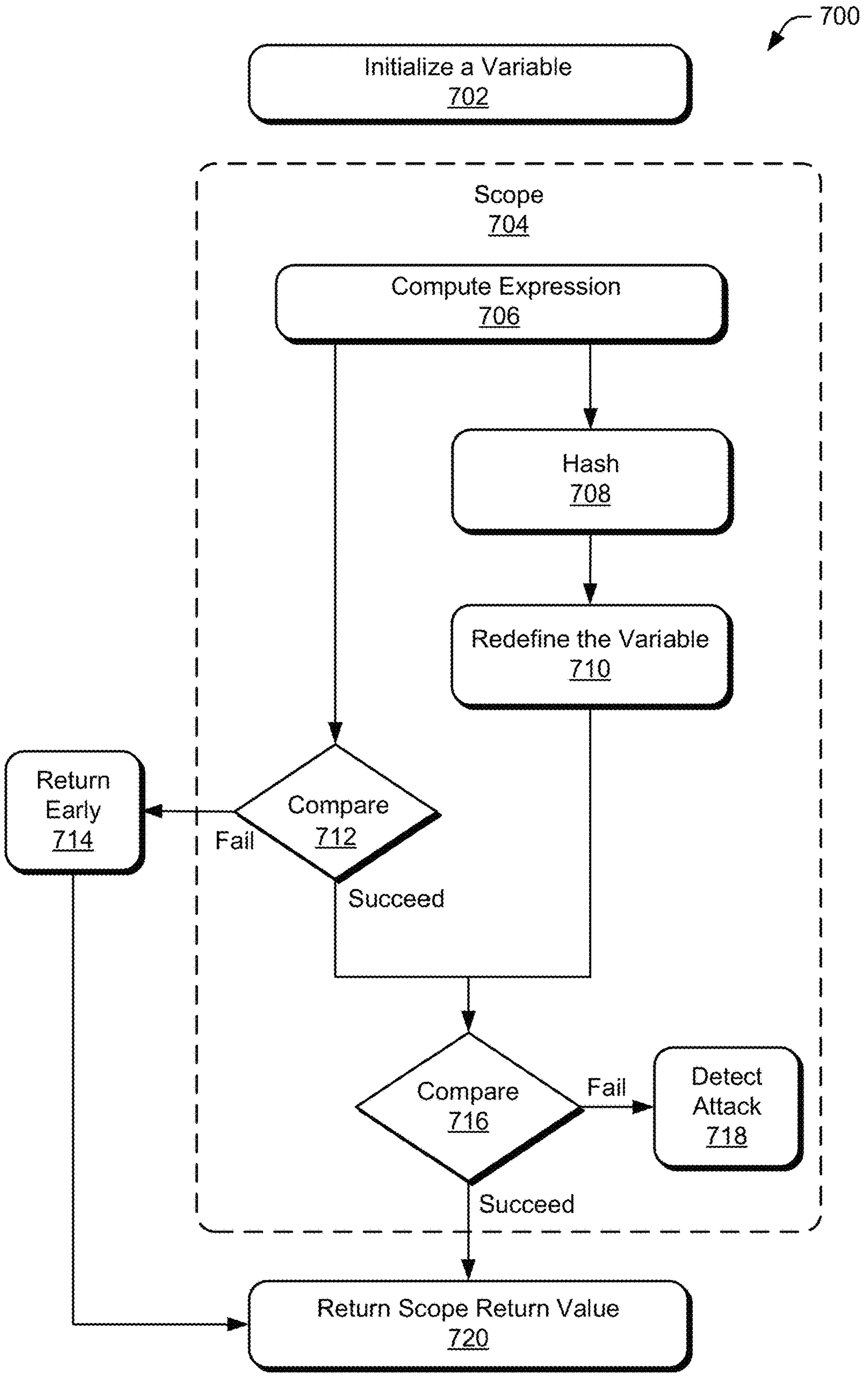
FIG. 7 illustrates an example implementation of the fault-detection manager configured to maintain control flow integrity measurements to validate flow of control in computing systems.

This section describes example implementations to control flow integrity measurements to validate control flow in computing systems. FIG. 7 illustrates an example implementation 700 of the fault-detection manager configured to maintain control flow integrity measurements to validate flow of control in computing systems.

In an implementation, as illustrated in FIG. 7, the fault-detection manager (e.g., fault-detection manager 112) may initialize a variable 702. Initializing the variable may include assigning an initial measurement value to the variable. The initial value may be a secret value stored in security-hardened memory (e.g., ROM 214). Initializing the variable to equal the initial value may be realized at any point before or during a scope 704.

The fault-detection manager may then compute an expression 706 effective to generate an expression return value. The fault-detection manager can then hash 708 the expression return value together with the measurement value using a non-cryptographic fingerprinting algorithm (e.g., composite fingerprinting algorithm) to generate a computed value. Responsive to generating the computed value, the fault-detection manager can redefine the variable to the computed value.

Before, during, or after the hashing 708 and/or the redefining of the variable 710, the fault-detection manager may compare 712 the expression return value. For example, the fault-detection manager may determine whether the expression return value indicates a successful or unsuccessful computation of the expression. If the comparison 712 fails, then the fault-detection manager may return early 714. If the comparison 712 succeeds then the fault-detection manager can compare 716 the measurement value to a predetermined value. In some examples, the fault-detection manager may repeat the computation of an expression 706, the hashing 708, the redefining 710, and the comparing 712 for a plurality of expressions.

If the comparison 716 fails, then the fault-detection manager can detect a fault injection attack. If the comparison 716 succeeds, then the fault-detection manager can return a scope return value.

Example Methods

Figure 8:
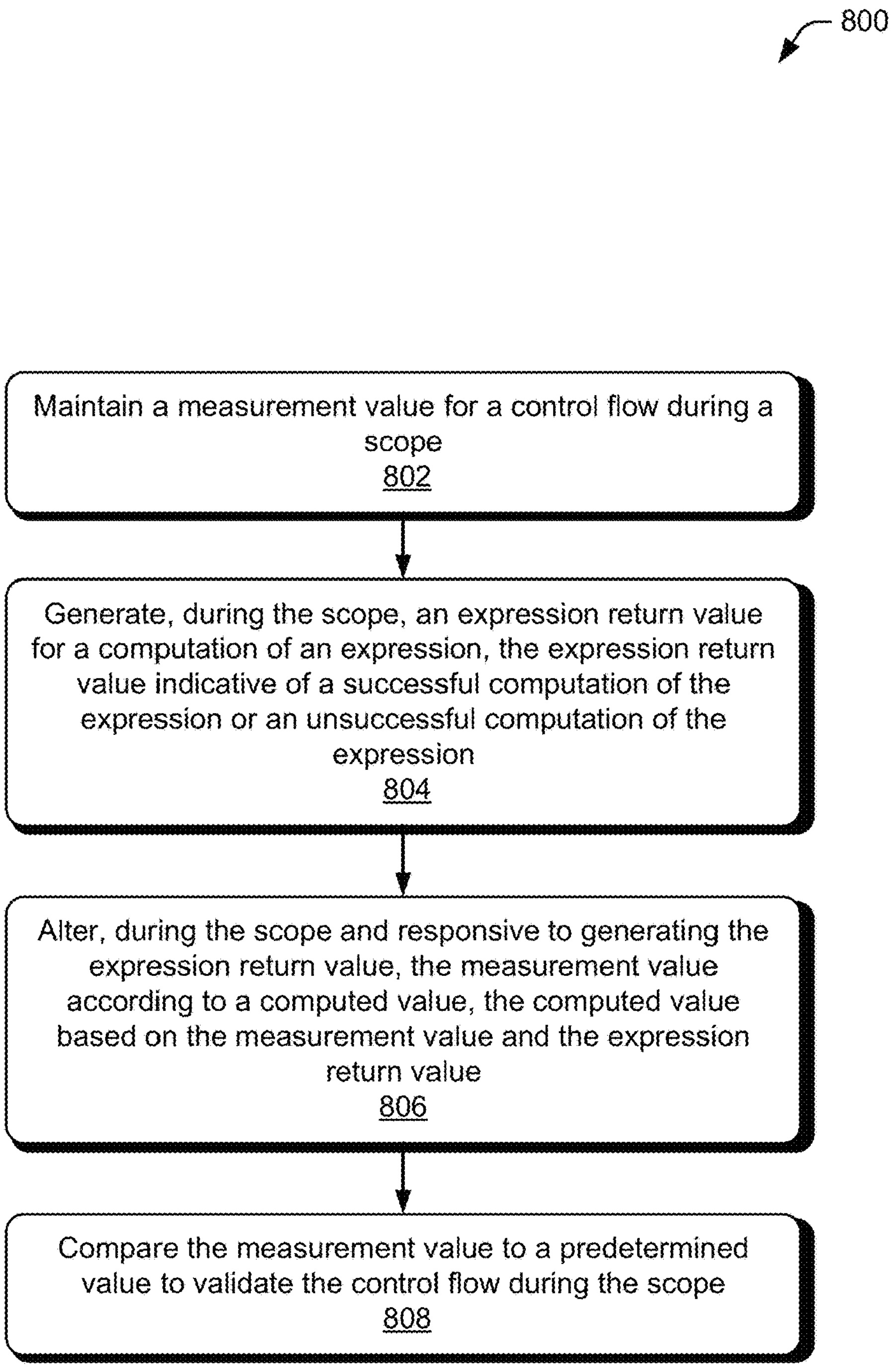
FIG. 8 illustrates example method to implement control flow integrity measurements to validate control flow in computing systems.

This section describes an example method to implement control flow integrity measurements to validate control flow in computing systems. This method is shown as sets of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 and entities detailed in FIGS. 2-7, reference to which is made for example only. The techniques are not limited to performance by one entity or multiple entities operating on one device. FIG. 8 illustrates example method 800 to implement control flow integrity measurements to validate control flow in computing systems.

At 802 the fault-detection manager (e.g., fault-detection manager 112) maintains a measurement value for a control flow during a scope. For example, the fault-detection manager can store a variable in memory having an assigned value. In another example, the fault-detection manager can create (e.g., declare) a variable and assign it a value.

At 804 the fault-detection manager generates, during the scope, an expression return value for a computation of an expression. The expression return value may be indicative of a successful computation of the expression or an unsuccessful computation of the expression.

At 806, the fault-detection manager alters, during the scope and responsive to generating the expression return value, the measurement value according to a computed value. The computed value may be based on the measurement value and the expression return value. For example, altering (e.g., updating) the measurement value can include setting the measurement value equal to the computed value.

At 808, the fault-detection manager compares the measurement value to a predetermined value to validate the control flow during the scope. For example, the fault-detection manager can determine if the measurement value does not equal the predetermined value and, as a result, identify a tampering (e.g., a fault injection attack) at the computing system.

System-on-Chip

Figure 9:
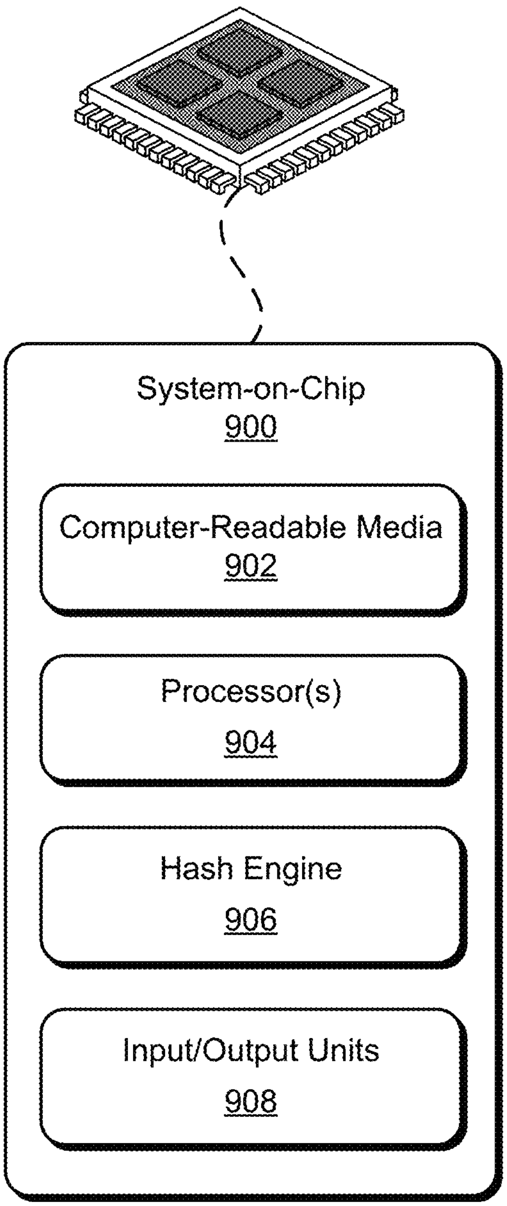
FIG. 9 illustrates an integrated circuit component implemented as an SoC 900 that can implement various aspects of control flow integrity measurements to validate control flow in computing systems.

FIG. 9 illustrates an integrated circuit component (e.g., integrated circuit component 118) implemented as an SoC 900 that can implement various aspects of control flow integrity measurements to validate control flow in computing systems. The SoC 900 may be a single chip including components that are fabricated on a same semiconductor substrate. Alternatively, the SoC may be a number of such chips that are epoxied together. The SoC 900 can be implemented in any suitable device, such as a smartphone, cellular phone, netbook, tablet computer, server, wireless router, network-attached storage, camera, smart appliance, printer, a set-top box, or any other suitable type of device. Although described with reference to an SoC, the entities of FIG. 9 may also be implemented as an ASIC, a field-programmable gate array (FPGA), or the like.

The SoC 900 can be integrated with electronic circuitry, including the components described in the operating system listed herein. The SoC 900 can also include an integrated data bus (not shown) that couples the various components of the SoC 900 for data communication between the components. The integrated data bus or other components of the SoC 900 may be exposed or accessed through an external port, such as a JTAG port. For example, components of the SoC 900 may be tested, configured, or programmed (e.g., flashed) through the external port at different stages of manufacture.

In this example, the SoC 900 includes computer-readable media 1102, one or more processor(s) 904, a hash engine 906, and I/O units 908. The computer-readable media may be stored in computer-readable storage media, including one or more non-transitory storage devices such as a RAM ((DRAM, NVRAM, or SRAM), ROM, or flash memory), hard drive, SSD, or any type of media suitable for storing electronic instructions, each coupled with a computer system bus.

The computer-readable media 902 of the SoC 900 may include executable code of a fault-detection manager (e.g., fault-detection manager 112). One or more of the processor(s) 904 operably coupled to computer-readable storage media having computer-readable media 902, may execute instructions of the fault-detection manager.

Although the subject matter has been described in language specific to structural features and/or methodological operations, it is to be understood that the subject matter defined in the appended claims is not necessarily limited to the specific features or operations described herein, including orders in which they are performed.

ADDITIONAL EXAMPLES

In the following section, additional examples are provided.

Example 1: A computer-implemented method comprising: maintaining a measurement value for a control flow during a scope; generating, during the scope, an expression return value for a computation of an expression, the expression return value indicative of a successful computation of the expression or an unsuccessful computation of the expression; altering, during the scope and responsive to generating the expression return value, the measurement value according to a computed value, the computed value based on the measurement value and the expression return value; and comparing the measurement value to a predetermined value to validate the control flow during the scope.

Example 2: The computer-implemented method as recited in example 1, further comprising: creating, prior to maintaining the measurement value, a variable configured to store the measurement value.

Example 3: The computer-implemented method as recited in example 2, further comprising: assigning, prior to maintaining the measurement value, an initial value to the variable configured to store the measurement value effective to set the measurement value equal to the initial value.

Example 4: The computer-implemented method as recited in example 3, wherein the initial value is a secret value stored in security-hardened read-only memory.

Example 5: The computer-implemented method as recited in any preceding example, wherein creating the variable includes declaring a local variable.

Example 6: The computer-implemented method as recited in any preceding example, wherein updating the measurement value includes: setting the measurement value equal to the computed value.

Example 7: The computer-implemented method as recited in any preceding example, wherein the scope includes a plurality of expressions.

Example 8: The computer-implemented method as recited in example 7, wherein the scope includes a function, and the plurality of expressions include function calls.

Example 9: The computer-implemented method as recited in example 7 or 8, further comprising: repeating, during the scope, the generating and the updating for each of the plurality of expressions.

Example 10: The computer-implemented method as recited in any preceding example, further comprising: returning, responsive to comparing the measurement value to the predetermined value, a scope return value indicative of a successful execution of the scope or an unsuccessful execution of the scope.

Example 11: The computer-implemented method as recited in example 10, wherein the scope return value and the expression return value include at least one error code.

Example 12: The computer-implemented method as recited in example 10 or 11, further comprising: determining, based on one or more conditional branch instructions, that the expression return value indicates the unsuccessful computation of the expression.

Example 13: The computer-implemented method as recited in example 12, further comprising: ceasing, responsive to determining that the expression return value indicates the unsuccessful computation of the expression, further execution of the scope; and returning the scope return value indicative of the unsuccessful execution of the scope.

Example 14: The computer-implemented method as recited in any preceding example, further comprising: generating the computed value using a hashing function.

Example 15: The computer-implemented method as recited in example 14, wherein: the hashing function includes a non-cryptographic, composite fingerprinting algorithm; and generating the computed value includes: combining two inputs together using at least one of: a non-commutative function including concatenation; or an injective function including serialization; and mapping the combined inputs to a fixed-size digest value.

Example 16: The computer-implemented method as recited in any preceding example, wherein updating the measurement value according to the computed value includes: manipulating the measurement value through one or more mathematical operations or bitwise operations.

Example 17: The computer-implemented method as recited in any preceding example, wherein the predetermined value is calculated prior to maintaining the measurement value and is based on a number of monadic error return decisions within the scope.

Example 18: The computer-implemented method as recited in example 17, wherein the predetermined value is stored in security-hardened memory.

Example 19: A system comprising: an integrated circuit including: at least one processor; and at least one computer-readable storage medium coupled to the at least one processor and comprising instructions that, when executed by the at least one processor, cause the processor to perform the method of any preceding example.

Example 20: The system of example 19, wherein the integrated circuit is configured to perform the method of any one of any preceding example without compiler optimization.

Example 21: A computer-implemented method comprising: generating a measurement value for a control flow of a check signature function, the check signature function configured to verify a digital signature; generating, during a scope of the check signature function, an expression return value indicative of a successful digital signature verification; updating, during the scope and responsive to generating the expression return value, the measurement value according to a computed value, the computed value based on the measurement value and the expression return value; and validating the control flow of the check signature function by comparing the measurement value to a predetermined value.

Example 22: The computer-implemented method as recited in example 21, wherein the expression return value is a second expression return value, the computer-implemented method further comprising: generating, prior to generating the second expression return value, a first expression return value indicative of a successful digital signature acquisition.

Example 23: The computer-implemented method as recited in example 22, wherein updating the measurement value updates the measurement value for each of the first expression return value and the second expression return value.

Example 24: The computer-implemented method as recited in any preceding example, wherein updating the measurement value includes: setting the measurement value equal to the computed value.

Example 25: The computer-implemented method as recited in any preceding example, further comprising: returning, responsive to validating the control flow of the check signature function, a scope return value.

Example 26: The computer-implemented method as recited in example 25, wherein the scope return value includes at least one error code, the at least one error code indicative of a successful validation of the control flow of the check signature function or an unsuccessful validation of the control flow of the check signature function.

Example 27: The computer-implemented method as recited in example 25 or 26, wherein the expression return value includes at least one error code, the at least one error code indicative of a successful digital signature verification or an unsuccessful digital signature verification.

Example 28: The computer-implemented method as recited in example 27, further comprising: determining, based on one or more conditional branch instructions, that the expression return value indicates the unsuccessful digital signature verification; ceasing, responsive to determining that the expression return value indicates the unsuccessful digital signature verification, further execution of the scope of the check signature function; and returning the scope return value indicative of the unsuccessful validation of the control flow of the check signature function.

Example 29: The computer-implemented method as recited in any preceding example, further comprising: generating the computed value using a hashing function.

Example 30: The computer-implemented method as recited in example 14, wherein: the hashing function includes a non-cryptographic, composite fingerprinting algorithm; and generating the computed value includes: combining two inputs together using at least one of: a noncommutative function including concatenation; or an injective function including serialization; and mapping the combined inputs to a fixed-size digest value.

Example 31: The computer-implemented method as recited in any preceding example, wherein updating the measurement value according to the computed value includes: manipulating the measurement value through one or more mathematical operations or bitwise operations.

Example 32: The computer-implemented method as recited in any preceding example, wherein the predetermined value is calculated prior to maintaining the measurement value and is based on a number of monadic error return decisions within the scope.

Example 33: The computer-implemented method as recited in example 32, wherein the predetermined value is stored in security-hardened memory.

Example 34: A system comprising: an integrated circuit including: at least one processor; and at least one computer-readable storage medium coupled to the at least one processor and comprising instructions that, when executed by the at least one processor, cause the processor to perform the method of any preceding example.

Example 35: The system of example 34, wherein the integrated circuit is configured to execute the instructions without compiler optimization.

Example 36: The system of example 34 or 35, wherein the system includes instructions compiled with optimization configured not to interfere with measurement value maintenance.

Example 37: A computer-implemented method, the computer-implemented method implemented within a scope and comprising: initializing a local variable configured to maintain a measurement value of a local control flow; computing an expression, the computation of the expression effective to generate a return value; hashing the measurement value and the return value together, the hashing effective to output a digest value; redefining, successive to the hashing, the measurement value of the local variable to the digest value; and comparing the measurement value of the local variable to an expected value stored in a static variable, the comparison effective to validate a control flow integrity.

Example 38: The computer-implemented method as recited in example 37, further comprising repeating the hashing and the redefining for each computation of an expression within a scope, prior to comparing the measurement value of the local variable to the expected value stored in the static variable.

Example 39: The computer-implemented method as recited in example 37 or example 38, wherein the hashing is computed by a non-cryptographic, composite fingerprinting algorithm, the non-cryptographic, composite fingerprinting algorithm effective to: combine two inputs together, the combining implemented using: a non-commutative function including concatenation; or an injective function including serialization; and map the combined inputs to a fixed-size digest value.

Example 40: The computer-implemented method as recited in any one of the preceding examples, wherein the expected value of the static variable is precomputed for a number of monadic error return decisions within the scope.

Example 41: The computer-implemented method as recited in any one of the preceding examples, wherein the return value is an error code, the error code capable of indicating a successful execution or a failing execution.

Example 42: The computer-implemented method as recited in any one of the preceding examples, wherein the scope is a function having at least one check construction, the at least one check construction configured to implement an early return if an error occurs.

Example 43: The computer-implemented method as recited in any one of the preceding examples, wherein the initializing the local variable initializes the measurement value to an initial secret value.

Example 44: The computer-implemented method as recited in any preceding example, wherein updating the measurement value according to the computed value includes redefining a variable maintaining the measurement value to the computed variable.

Conclusion

Although implementations of techniques for, and apparatuses enabling, control flow integrity measurements to validate control flow in computing systems have been described in language specific to features and/or methods, it is to be understood that the subject of the appended claims is not necessarily limited to the specific features or methods described. Rather, the specific features and methods are disclosed as example implementations enabling the control flow integrity measurements to validate control flow in computing systems.

What is claimed is:

1. A computer-implemented method comprising:

generating a measurement value for a control flow of a check signature function, the check signature function configured to verify a digital signature;

generating, during a scope of the check signature function, an expression return value indicative of a successful digital signature verification;

updating, during the scope and responsive to generating the expression return value, the measurement value according to a computed value, the computed value based on a mathematical operation performed on both the measurement value and the expression return value, the mathematical operation creating a data dependency between a result of the digital signature verification and the measurement value, the mathematical operation including a non-cryptographic fingerprinting function configured to:

combine the measurement value and the expression return value using an operation selected from a group consisting of a noncommutative function, an injective function, a serialization, a concatenation, a Fowler-Noll-Vo hash calculation, and a calculation of a Hamming weight; and map the combined values to a fixed-size digest value to produce the computed value; and validating the control flow of the check signature function by comparing the measurement value to a predetermined value.

2. The computer-implemented method as recited in claim 1, wherein the expression return value is a second expression return value, the computer-implemented method further comprising:

generating, prior to generating the second expression return value, a first expression return value indicative of a successful digital signature acquisition.

3. The computer-implemented method as recited in claim 2, wherein updating the measurement value updates the measurement value for each of the first expression return value and the second expression return value.

4. The computer-implemented method as recited in claim 1, wherein updating the measurement value further includes:

setting the measurement value equal to the computed value.

5. The computer-implemented method as recited in claim 1, further comprising:

returning, responsive to validating the control flow of the check signature function, a scope return value.

6. The computer-implemented method as recited in claim 5, wherein the scope return value includes at least one error code, the at least one error code indicative of a successful validation of the control flow of the check signature function or an unsuccessful validation of the control flow of the check signature function.

7. The computer-implemented method as recited in claim 6, wherein the expression return value includes at least one error code, the at least one error code indicative of a successful digital signature verification or an unsuccessful digital signature verification.

8. The computer-implemented method as recited in claim 7, further comprising:

determining, based on one or more conditional branch instructions, that the expression return value indicates the unsuccessful digital signature verification;

ceasing, responsive to determining that the expression return value indicates the unsuccessful digital signature verification, further execution of the scope of the check signature function; and returning the scope return value indicative of the unsuccessful validation of the control flow of the check signature function.

9. The computer-implemented method as recited in claim 1, further comprising:

generating the computed value using a hashing function.

10. The computer-implemented method as recited in claim 1, wherein the predetermined value is calculated prior to maintaining the measurement value and is based on a number of monadic error return decisions within the scope.

11. The computer-implemented method as recited in claim 10, wherein the predetermined value is stored in security-hardened memory.

12. A system comprising:

an integrated circuit including:

at least one processor; and a computer-readable storage medium coupled to the at least one processor and comprising instructions that, when executed by the at least one processor, cause the at least one processor to:

generate a measurement value for a control flow of a check signature function, the check signature function configured to verify a digital signature;

generate, during a scope of the check signature function, an expression return value indicative of a successful digital signature verification;

update, during the scope and responsive to generating the expression return value, the measurement value according to a computed value, the computed value based on a mathematical operation performed on both the measurement value and the expression return value, the mathematical operation creating a data dependency between a result of the digital signature verification and the measurement value, the mathematical operation including a non-cryptographic fingerprinting function configured to:

combine the measurement value and the expression return value using an operation selected from a group consisting of a noncommutative function, an injective function, a serialization, a concatenation, a Fowler-Noll-Vo hash calculation, and a calculation of a Hamming weight; and map the combined values to a fixed-size digest value to produce the computed value; and validate the control flow of the check signature function by comparing the measurement value to a predetermined value.

13. The system as recited in claim 12, wherein the expression return value is a second expression return value, and wherein the instructions further cause the at least one processor to:

generate, prior to the generation of the second expression return value, a first expression return value indicative of a successful digital signature acquisition.

14. The system as recited in claim 13, wherein the update of the measurement value updates the measurement value for each of the first expression return value and the second expression return value.

15. The system as recited in claim 12, wherein the instructions that cause the at least one processor to update to the measurement value further cause the at least one processor to set the measurement value equal to the computed value.

16. The system as recited in claim 12, wherein the integrated circuit is configured to execute the instructions without compiler optimization.

17. The system as recited in claim 12, wherein the system comprises instructions compiled with optimization configured in such a manner so as not to interfere with the generation of the measurement value, the generation of the expression return value, the update to the measurement value, and the validation of the control flow.

18. The system as recited in claim 12, wherein updating the measurement value further includes setting the measurement value equal to the computed value.

19. The system as recited in claim 12, wherein the instructions further cause the at least one processor to return, responsive to the validation of the control flow of the check signature function, a scope return value.

20. The system as recited in claim 19, wherein the scope return value includes at least one error code, the at least one error code indicative of a successful validation of the control flow of the check signature function or an unsuccessful validation of the control flow of the check signature function.

* * * * *